US008365031B2

(12) United States Patent
Suzuki et al.

(10) Patent No.: US 8,365,031 B2
(45) Date of Patent: Jan. 29, 2013

(54) SOFT ERROR CORRECTION METHOD, MEMORY CONTROL APPARATUS AND MEMORY SYSTEM (75) Inventors: Kenji Suzuki, Kawasaki (JP); Yasufumi Honda, Kawasaki (JP); Takashi Koguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 592 days.

(21) Appl. No.: 12/573,491

(22) Filed: Oct. 5, 2009

(65) Prior Publication Data
US 2010/0023827 A1 Jan. 28, 2010

Related U.S. Application Data (62) Division of application No. 11/197,261, filed on Aug. 5, 2005, now Pat. No. 7,631,244.

(30) Foreign Application Priority Data

Mar. 17, 2005 (JP) ................................. 2005-078010

(51) Int. Cl.
G06F 11/00 (2006.01)
(52) U.S. Cl. .......... 714/747; 702/182; 702/183; 714/25; 714/47.1; 714/6.1; 714/704
(58) Field of Classification Search ............. 702/182, 702/183, 132; 700/29, 30; 714/25, 47, 52, 714/6.1
See application file for complete search history.

(56) References Cited

U.S. PATENT DOCUMENTS

| 3,781,812 | A | | 12/1973 | Wymore et al. | |
|---|---|---|---|---|---|
| 4,174,537 | A | | 11/1979 | Chu et al. | |
| 4,234,918 | A | | 11/1980 | Chu et al. | |
| 4,255,808 | A | | 3/1981 | Schaber | |
| 4,371,949 | A | * | 2/1983 | Chu et al. | 714/52 |
| 4,394,763 | A | * | 7/1983 | Nagano et al. | 714/6.1 |
| 4,920,539 | A | * | 4/1990 | Albonesi | 714/764 |
| 4,955,024 | A | | 9/1990 | Pfeiffer et al. | |
| 5,263,032 | A | | 11/1993 | Porter et al. | |
| 5,331,646 | A | * | 7/1994 | Krueger et al. | 714/766 |
| 5,412,661 | A | | 5/1995 | Hao et al. | |

(Continued)

FOREIGN PATENT DOCUMENTS

| CN | 1149344 | 5/1997 |
|---|---|---|
| JP | 58-175197 | 10/1983 |

(Continued)

OTHER PUBLICATIONS

Supplemental Notice of Allowance mailed Oct. 7, 2009; U.S. Appl. No. 11/197,261.

(Continued)

Primary Examiner — Scott Baderman
Assistant Examiner — Jeison C Arcos
(74) Attorney, Agent, or Firm — Staas & Halsey LLP (57) ABSTRACT A soft error correction method is for a memory system having memory access controllers accessing memories for storing byte-sliced data in cycle synchronism, and a system controller receiving a memory access from an arbitrary one of MPUs and issuing a memory address to the memory access controllers. When a correctable error is detected in data read from one memory, an error address where the error was detected is held within a memory access controller, and an error notification is made to the system controller from the memory access controller. In response to the error notification, the memory access controller holds the error address from the system controller without intervention from the MPUs, and reads, corrects and rewrites the data to the error address.

6 Claims, 11 Drawing Sheets

U.S. PATENT DOCUMENTS

| | | | |
|---|---|---|---|
| 5,528,755 A | 6/1996 | Beardsley et al. | |
| 5,951,691 A | 9/1999 | Ng et al. | |
| 6,038,676 A | 3/2000 | Yanes et al. | |
| 6,101,614 A | 8/2000 | Gonzales et al. | |
| 6,349,390 B1 | 2/2002 | Dell et al. | |
| 6,470,421 B1 | 10/2002 | Bui et al. | |
| 6,711,703 B2 * | 3/2004 | MacLaren et al. | 714/704 |
| 6,715,116 B2 * | 3/2004 | Lester et al. | 714/718 |
| 6,965,537 B1 | 11/2005 | Klein et al. | |
| 2001/0044917 A1 | 11/2001 | Lester et al. | |
| 2001/0047497 A1 | 11/2001 | Larson et al. | |
| 2003/0145257 A1 * | 7/2003 | Fields et al. | 714/704 |
| 2004/0078723 A1 * | 4/2004 | Gross et al. | 714/47 |
| 2004/0199715 A1 | 10/2004 | Ellis et al. | |

FOREIGN PATENT DOCUMENTS

| | | |
|---|---|---|
| JP | 59-217298 | 12/1984 |
| JP | 2000-10871 | 1/2000 |
| KR | 10-2004-0086168 | 10/2004 |
| WO | 2004/104840 A | 12/2004 |

OTHER PUBLICATIONS

Japanese Office Action issued Jan. 4, 2011 in corresponding Japanese Patent Application 2005-078010.

U.S. Appl. No. 11/197,261, filed Aug. 5, 2005, Kenji Suzuki, et al., Fujitsu Limited.

Korean Office Action, dated Oct. 26, 2006, and issued in related Korean Patent Application No. 10-2005-0076013.

Office Action issued in corresponding Chinese Patent Application No. 2005100933550 on Jul. 27, 2007.

European Search Report issued Apr. 20, 2009 in corresponding European Patent Application 05254873.2.

European Search Report issued Jun. 10, 2009 in corresponding European Patent Application 05254873.2.

Mar. 27, 2008 Restriction Office Action.

Jul. 2, 2008 Restriction Office Action.

Dec. 29, 2008 Non-Final Office Action.

Aug. 5, 2009 Notice of Allowance and Fee(s) Due.

* cited by examiner

SOFT ERROR CORRECTION METHOD, MEMORY CONTROL APPARATUS AND MEMORY SYSTEM

CROSS-REFERENCE TO RELATED APPLICATIONS

The subject application is a Divisional of U.S. Ser. No. 11/197,261 filed Aug. 5, 2005 now U.S. Pat. No. 7,631,244 and claims the benefit of Japanese Patent Application No. 2005-78010, filed Mar. 17, 2005.

BACKGROUND OF THE INVENTION

1. Field of the Invention

The present invention generally relates to soft error correction methods, memory control apparatuses and memory systems, and more particularly to a soft error correction method for correcting a soft error within a memory, a memory control apparatus suited for such a soft error correction method, and a memory system that employs such a soft error correction method.

2. Description of the Related Art

Figure 1:
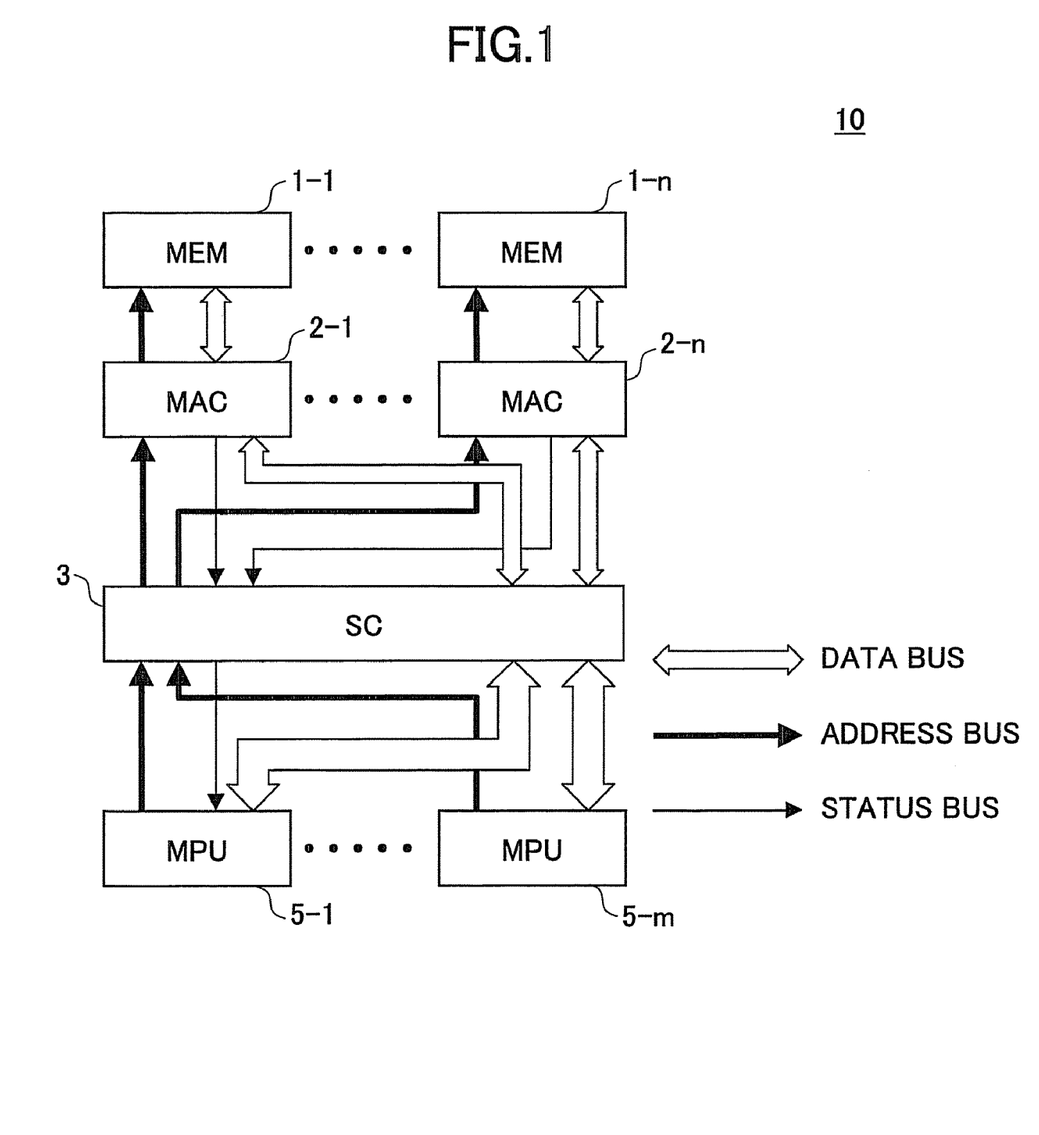
FIG. 1 is a system block diagram showing an example of a conventional memory system.

FIG. 1 is a system block diagram showing an example of a conventional memory system. A memory system 10 shown in FIG. 1 has a structure for accessing byte-sliced data, that is, data that have been sliced in units of bytes. The memory system 10 includes a plurality of memories (MEMs) 1-1 through 1-n, a plurality of memory access controllers (MACs) 2-1 through 2-n, a system controller (SC) 3, and a plurality of MPUs 5-1 through 5-m. In FIG. 1, a data bus is indicated by a white arrow, an address bus is indicated by a bold solid line arrow, and a status bus is indicated by a solid line arrow.

The memory access controllers 2-1 through 2-n are constructed to access the memories 1-1 through 1-n in units of bytes of the byte-sliced data, at synchronized access cycles. In other words, all of the memory access controllers 2-1 through 2-n constantly and simultaneously carry out the memory accesses with respect to all of the memories 1-1 through 1-n at the same timing, so that no synchronization error is generated in the accesses to the memories 1-1 through 1-n.

On the other hand, in the memories 1-1 through 1-n that are made up of memory devices such as DRAMs and SRAMs, a soft error is generated at a predetermined probability. Hence, in a case where reliability is required of the memory system 10, the data within the memories 1-1 through 1-n are corrected using a data protection mechanism such as the ECC.

For example, if a correctable soft error is generated in one memory 1-1 and the system controller 3 detects this soft error, generally, the hardware of the system controller 3 carries out an error correction operation by itself. In this case, the following series of operations are required.

Figure 2:
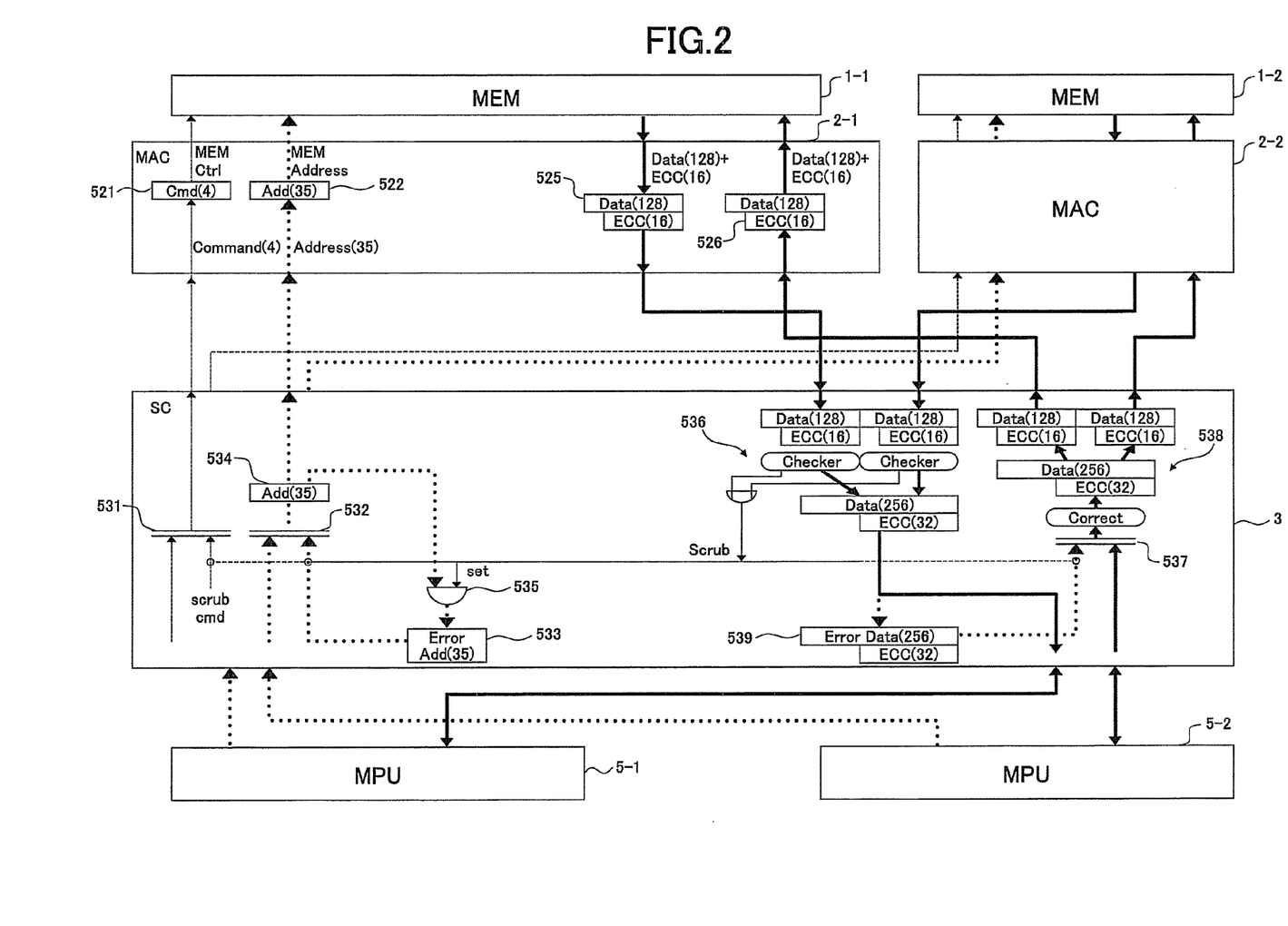
FIG. 2 is a system block diagram functionally showing an important part of the memory system.
Figure 3:
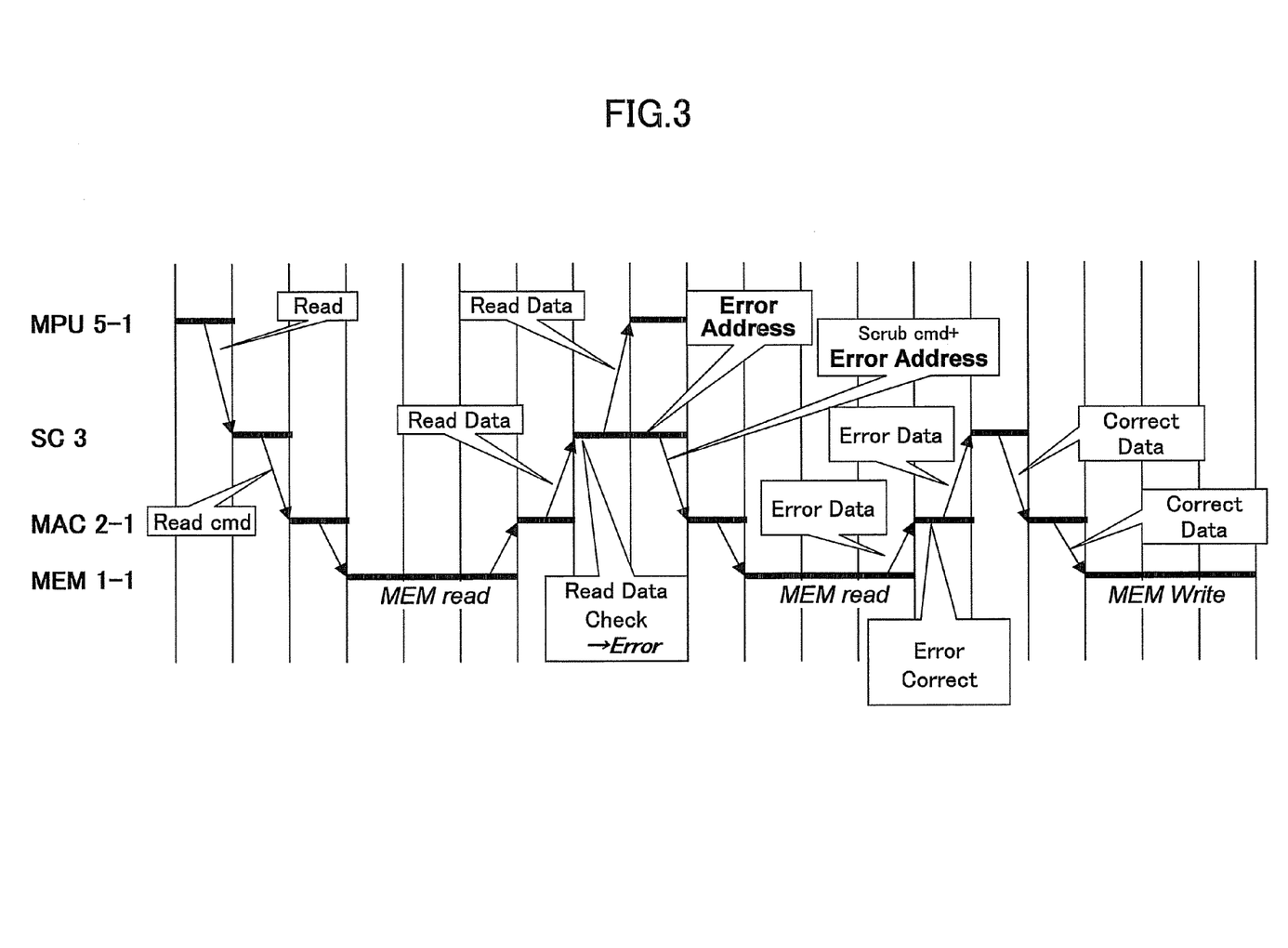
FIG. 3 is a time chart for explaining an error correction operation.

FIGS. 2 and 3 are diagrams for explaining the error correction operation in such a case. FIG. 2 is a system block diagram functionally showing an important part of the memory system 10, and FIG. 3 is a time chart for explaining the error correction operation. In FIG. 2, a dotted line arrow indicates a command flow, a bold dotted line arrow indicates an address flow, a solid line arrow indicates a status flow, and a bold solid line arrow indicates a data flow. In addition, numerals in brackets in FIG. 2 indicate the number of bits.

As shown FIG. 2, each of the memory access controllers 2-1 through 2-n includes registers 521, 522, 525 and 526 in addition to a controller (not shown). The system controller 3 includes selectors 531 and 532, registers 533 and 534, an AND circuit 535, an error detecting part 536, a selector 537, an error correcting part 538 and a register 539, in addition to a controller (not shown).

First, as shown in FIGS. 2 and 3, when a read command from the MPU 5-1 is input to the system controller 3 together with an address, the system controller 3 inputs the read command (Read cmd) and the address (Address) to the memory access controller 2-1 via the selectors 531 and 532. The read command (Command) and the address (Address) are temporarily held in the registers 521 and 522 of the memory access controller 2-1, and input to the memory 1-1 at a memory prescribed timing. The data (Data) read from the memory 1-1 (MEM Read) and including an ECC are input to the memory access controller 2-1 and temporarily held in the register 525 within the memory access controller 2-1, and input to the system controller 3 at a memory prescribed timing. If no error (Error) exists in the read data (Read Data) as a result of the error detection (Read Data Check) using the ECC in the error detecting part 536 of the system controller 3, the read data (Correct Data) is input to the MPU 5-1.

On the other hand, if an error exists in the read data as a result of the error detection using the ECC in the system controller 3, but the read data (Error Data) is correctable by the ECC (Error Correct), a read command (Scrub cmd) for correcting the error with respect to the address (Error Address) where the error was detected is input to the memory access controller 2-1, so as to read the error data (Error Data) from the memory 1-1. Since the error in the read data is correctable using the ECC in the error correcting part 538 of the system controller 3, the read data is input to the error correcting part 538 via the register 539 and the selector 537 and corrected, and the corrected data (corrected read data) is input to the memory access controller 2-1 together with a write command for correcting the error. The memory access controller 2-1 temporarily holds the corrected data in the register 526, and rewrites the corrected data to the address where the above described error was detected, at a prescribed timing. Hence, the correctable soft error within the memory 1-1 is corrected.

In the case of a normal data write (MEM Write), the write data from the MPU 5-1 is input to the memory access controller 2-1 via the system controller 3.

As described above, the memory system 10 is constructed so that all of the memory access controllers 2-1 through 2-n constantly and simultaneously carry out the memory accesses with respect to all of the memories 1-1 through 1-n at the same timing. For this reason, a soft error correction operation similar to the soft error correction operation with respect to the memory 1-1 via the memory access controller 2-1 is simultaneously carried out with respect to the memories 1-2 through 1-n via the other memory access controllers 2-2 through 2-n, regardless of whether or not the soft error exists in the memories 2-2 through 2-n.

A system for remedying a memory error has been proposed in a Japanese Laid-Open Patent Application No. 59-217298, for example.

However, in the conventional memory system, the error detection and the error correction are carried out in the system controller. As a result, there were problems in that the structure of the system controller becomes complex, and the load on the system controller is large. In addition, there was a problem in that the application cannot be made with respect to a memory system in which the system controller and a crossbar switch are separate.

SUMMARY OF THE INVENTION

Accordingly, it is a general object of the present invention to provide a novel and useful soft error correction method, memory control apparatus and memory system, in which the problems described above are suppressed.

Another and more specific object of the present invention is to provide a soft error correction method, a memory control apparatus and a memory system, which can make the structure of a system controller relatively simple, reduce the load on the system controller, and enable application to a memory system in which the system controller and a crossbar switch are separate.

Still another object of the present invention is to provide a soft error correction method for a memory system having n memory access controllers that are configured to access n memories for storing byte-sliced data in cycle synchronism, and a system controller that is configured to receive a memory access from an arbitrary one of m MPUs and to issue a memory address with respect to the n memory access controllers, where m and n are integers greater than or equal to two, comprising: when a correctable error is detected in data read from one of the memories, holding an error address where the error was detected within a corresponding one of the memory access controllers, and making an error notification with respect to the system controller from the corresponding one of the memory access controllers; and responsive to the error notification, controlling the one of the memory access controllers holding the error address from the system controller without intervention from the MPUs, reading the data from the error address of the corresponding one of the memories, correcting the error and rewriting corrected data to the error address. According to the soft error correction method of the present invention, it is possible to make the structure of the system controller relatively simple, reduce the load on the system controller, and enable application to a memory system in which the system controller and the crossbar switch are separate.

A further object of the present invention is to provide a soft error correction method for a memory system having n memory access controllers that are configured to access n memories for storing byte-sliced data in cycle synchronism, and a system controller that is configured to receive a memory access from an arbitrary one of m MPUs and to issue a memory address with respect to the n memory access controllers, where m and n are integers greater than or equal to two, comprising: when a correctable error is detected in data read from one of the memories, holding an error generation and an error address where the error was detected within a corresponding one of the memory access controllers; and responsive to the error generation, reading the data from the error address of the corresponding one of the memories, correcting the error and rewriting corrected data to the error address by the one of the memory access controllers holding the error address from the system controller, periodically or when an idle state continues for a predetermined time, without intervention from the MPUs. According to the soft error correction method of the present invention, it is possible to make the structure of the system controller relatively simple, reduce the load on the system controller, and enable application to a memory system in which the system controller and the crossbar switch are separate.

Another object of the present invention is to provide a memory control apparatus for a memory system having n memory access controllers that are configured to access n memories for storing byte-sliced data in cycle synchronism, and a system controller that is configured to receive a memory access from an arbitrary one of m MPUs and to issue a memory address with respect to the n memory access controllers, where m and n are integers greater than or equal to two, comprising a part configured to hold an error address where a correctable error is detected within a corresponding one of the memory access controllers, when the correctable error is detected in data read from one of the memories, and to make an error notification with respect to the system controller from the corresponding one of the memory access controllers; and a part, responsive to the error notification, configured to control the one of the memory access controllers holding the error address from the system controller without intervention from the MPUs, to read the data from the error address of the corresponding one of the memories, to correct the error and to rewrite corrected data to the error address. According to the memory control apparatus of the present invention, it is possible to make the structure of the system controller relatively simple, reduce the load on the system controller, and enable application to a memory system in which the system controller and the crossbar switch are separate.

Still another object of the present invention is to provide a memory control apparatus for a memory system having n memory access controllers that are configured to access n memories for storing byte-sliced data in cycle synchronism, and a system controller that is configured to receive a memory access from an arbitrary one of m MPUs and to issue a memory address with respect to the n memory access controllers, where m and n are integers greater than or equal to two, comprising a part configured to hold an error generation and an error address where a correctable error is detected within a corresponding one of the memory access controllers, when the correctable error is detected in data read from one of the memories; and a part, responsive to the error generation, configured to read the data from the error address of the corresponding one of the memories, to correct the error and rewrite corrected data to the error address by the one of the memory access controllers holding the error address from the system controller, periodically or when an idle state continues for a predetermined time, without intervention from the MPUs. According to the memory control apparatus of the present invention, it is possible to make the structure of the system controller relatively simple, reduce the load on the system controller, and enable application to a memory system in which the system controller and the crossbar switch are separate.

A further object of the present invention is to provide a memory system comprising n memory access controllers configured to access n memories for storing byte-sliced data in cycle synchronism; and a system controller configured to receive a memory access from an arbitrary one of m MPUs and to issue a memory address with respect to the n memory access controllers, where m and n are integers greater than or equal to two, wherein: when a correctable error is detected in data read from one of the memories, an error address where the error was detected is held within a corresponding one of the memory access controllers, and an error notification is made with respect to the system controller from the corresponding one of the memory access controllers; and responsive to the error notification, the one of the memory access controllers holding the error address is controlled from the system controller without intervention from the MPUs, the data from the error address of the corresponding one of the memories is read, the error is corrected and corrected data is rewritten to the error address. According to the memory system of the present invention, it is possible to make the structure of the system controller relatively simple, reduce the load on the system controller, and enable application to a memory system in which the system controller and the crossbar switch are separate.

Another object of the present invention is to provide a memory system comprising n memory access controllers configured to access n memories for storing byte-sliced data in cycle synchronism; and a system controller configured to receive a memory access from an arbitrary one of m MPUs and to issue a memory address with respect to the n memory access controllers, where m and n are integers greater than or equal to two, wherein: when a correctable error is detected in data read from one of the memories, an error generation and an error address where the error was detected are held within a corresponding one of the memory access controllers; and responsive to the error generation, the data is read from the error address of the corresponding one of the memories, the error is corrected and corrected data is rewritten to the error address by the one of the memory access controllers holding the error address from the system controller, periodically or when an idle state continues for a predetermined time, without intervention from the MPUs. According to the memory system of the present invention, it is possible to make the structure of the system controller relatively simple, reduce the load on the system controller, and enable application to a memory system in which the system controller and the crossbar switch are separate.

Still another object of the present invention is to provide a soft error correction method for a memory system having n memory access controllers that are configured to access n memories for storing byte-sliced data in cycle synchronism, a system controller that is configured to receive a memory access from an arbitrary one of m MPUs and to issue a memory address with respect to the n memory access controllers, and a crossbar switch that is configured to switch data between the memory access controllers and the MPUs, where m and n are integers greater than or equal to two, comprising: when a correctable error is detected in data read from one of the memories, an error notification and an error address where the error was detected are sent from a corresponding one of the memory access controllers to the system controller; and responsive to the error notification, sending the error address where the error was detected from the system controller to the corresponding one of the memory access controllers without intervention from the MPUs, to control the corresponding one of the memory access controllers to read the data from the error address, correct the error and rewrite corrected data to the error address. According to the soft error correction method of the present invention, it is possible to make the structure of the system controller relatively simple, reduce the load on the system controller, and enable application to a memory system in which the system controller and the crossbar switch are separate.

Other objects and further features of the present invention will be apparent from the following detailed description when read in conjunction with the accompanying drawings.

DETAILED DESCRIPTION OF THE PREFERRED EMBODIMENTS

A description will be given of embodiments of a soft error correction method, a memory control apparatus and a memory system according to the present invention, by referring to FIG. 4 and the subsequent figures.

Figure 4:
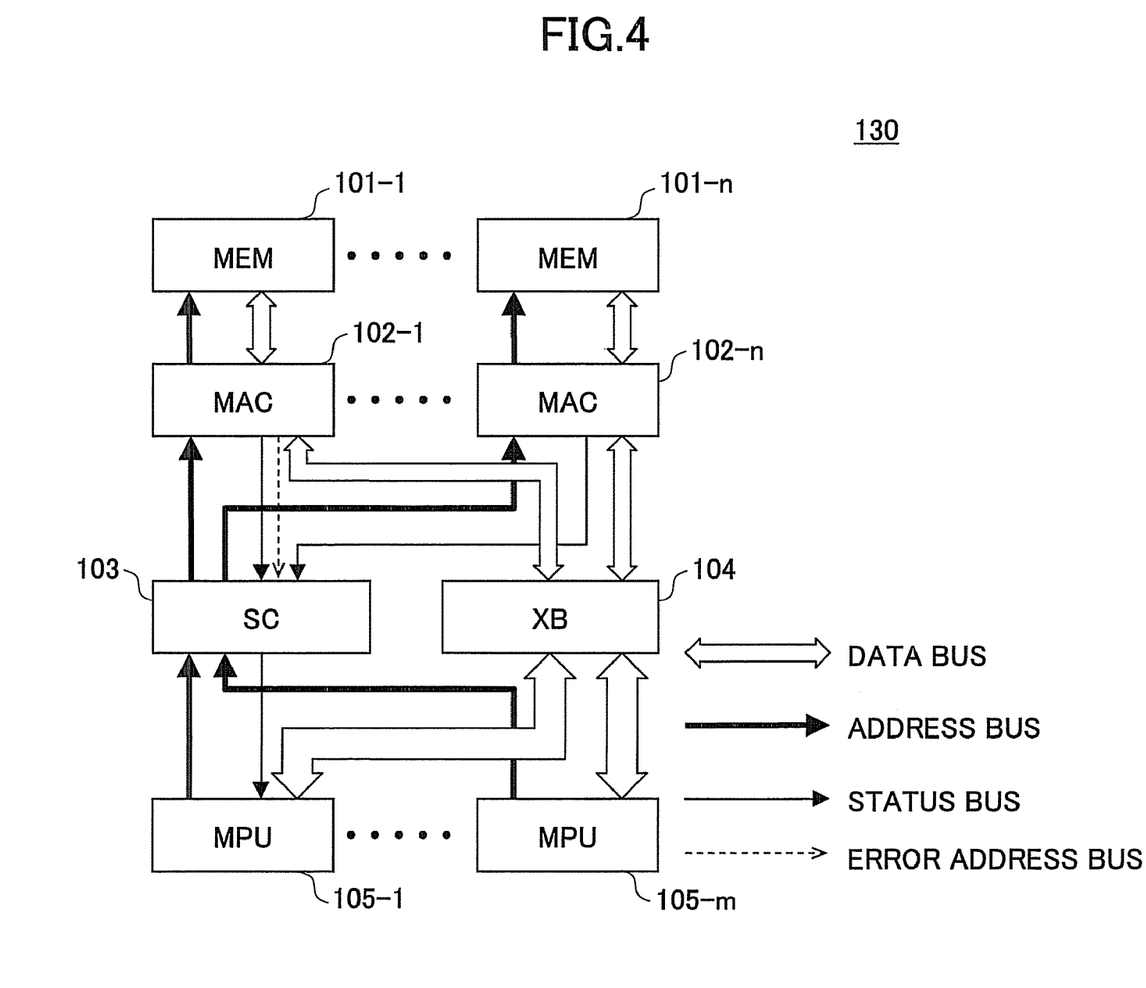
FIG. 4 is a system block diagram showing a first embodiment of a memory system according to the present invention.

FIG. 4 is a system block diagram showing a first embodiment of the memory system according to the present invention. This embodiment of the memory system employs a first embodiment of the soft error correction method of the present invention. In this embodiment, an error address is sent to a system controller from a memory access controller that detects an error, and an error correction operation is carried out by sending the error address from the system controller to all memory access controllers.

A memory system 130 shown in FIG. 4 has a structure for accessing byte-sliced data, that is, data that have been sliced in units of bytes. The memory system 130 includes a plurality of memories (MEMs) 101-1 through 101-n, a plurality of memory access controllers (MACs) 102-1 through 102-n, a system controller (SC) 103, a crossbar switch (XB) 104, and a plurality of memories (MEMs) 105-1 through 105-m. In FIG. 4, a data bus is indicated by a white arrow, an address bus is indicated by a bold solid line arrow, a status bus is indicated by a solid line arrow, and an error address bus is indicated by a dotted line arrow.

The memory access controllers 102-1 through 102-n are constructed to access the memories 101-1 through 101-n in units of bytes of the byte-sliced data, at synchronized access cycles. In other words, all of the memory access controllers 102-1 through 102-n constantly and simultaneously carry out the memory accesses with respect to all of the memories 101-1 through 101-n at the same timing, so that no synchronization error is generated in the accesses to the memories 101-1 through 101-n.

On the other hand, in the memories 101-1 through 101-n that are made up of memory devices such as DRAMs and SRAMs, a soft error is generated at a predetermined probability. Hence, in a case where reliability is required of the memory system 130, the data within the memories 101-1 through 101-n are corrected using a data protection mechanism such as the ECC.

For example, if a correctable soft error is generated in one memory 101-1 and the memory access controller 102-1 detects this soft error, the memory access controller 102-1 that detects the soft error cannot carry out the error correction operation by itself, because all of the memory access controllers 102-1 through 102-n operate in synchronism. The error correction operation must be carried out in response to a command from the system controller 103, for example. For this reason, in a case where the correctable soft error is generated within the memory 101-1 and the system controller 103 carries out the error correction operation with respect to the soft error within the memory 101-1 via the memory access controller 102-1, the following series of operations are required.

Figure 5:
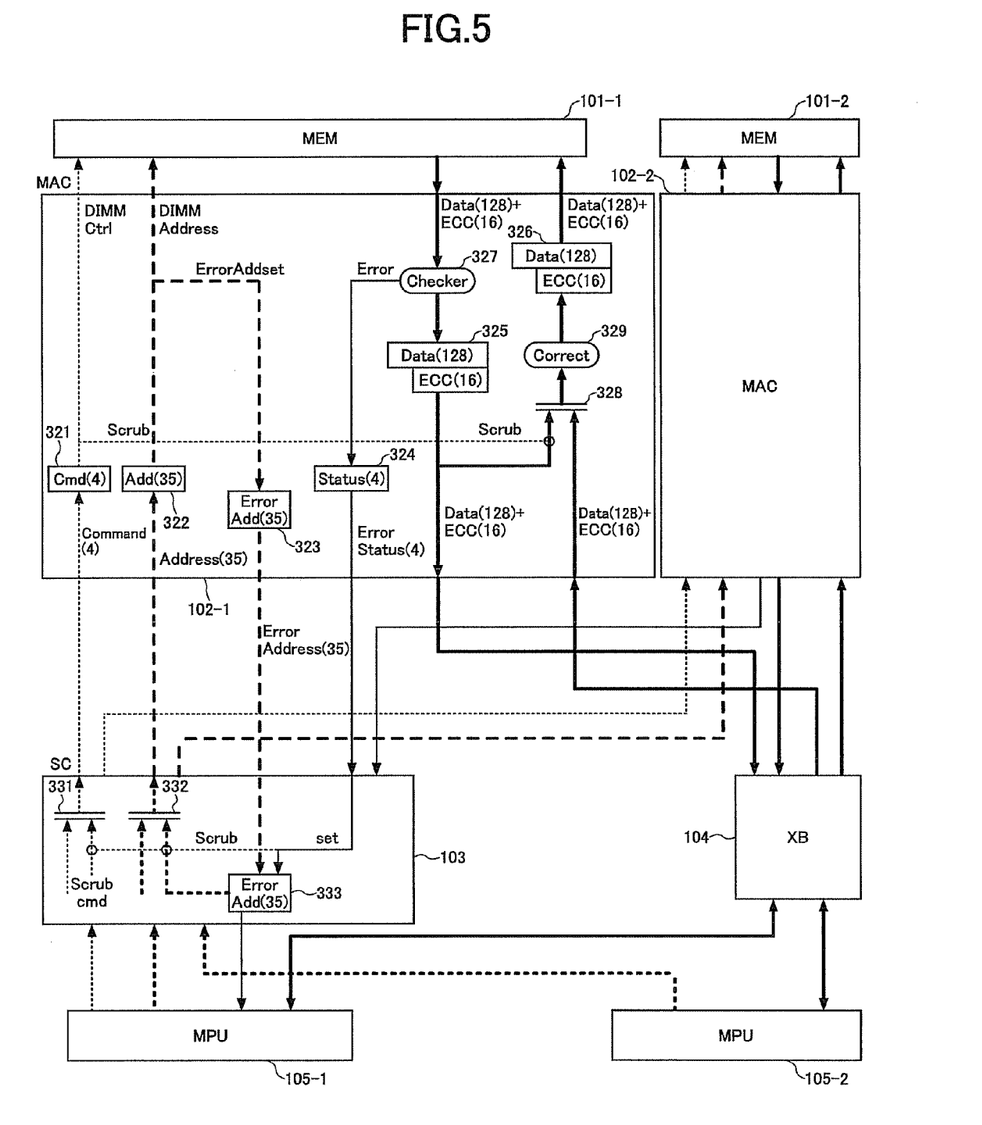
FIG. 5 is a system block diagram functionally showing an important part of the first embodiment of the memory system.
Figure 6:
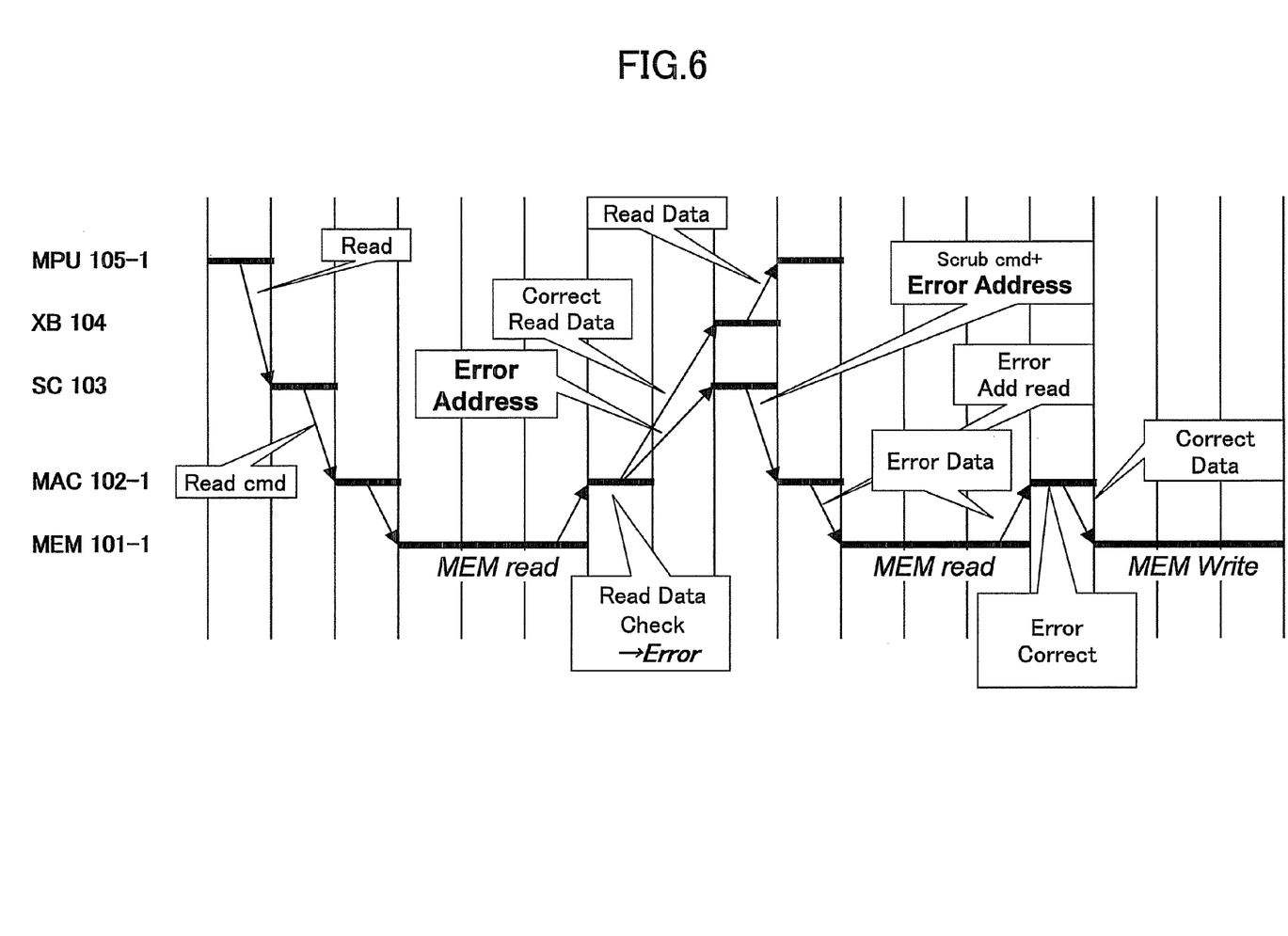
FIG. 6 is a time chart for explaining an error correction operation of the first embodiment.

FIGS. 5 and 6 are diagrams for explaining the error correction operation in such a case. FIG. 5 is a system block diagram functionally showing an important part of the memory system 130, and FIG. 6 is a time chart for explaining the error correction operation of this first embodiment. In FIG. 5, a dotted line arrow indicates a command flow, a bold dotted line arrow indicates an address flow, a solid line arrow indicates a status flow, and a bold solid line arrow indicates a data flow. In addition, numerals in brackets in FIG. 5 indicate the number of bits.

Figure 9:
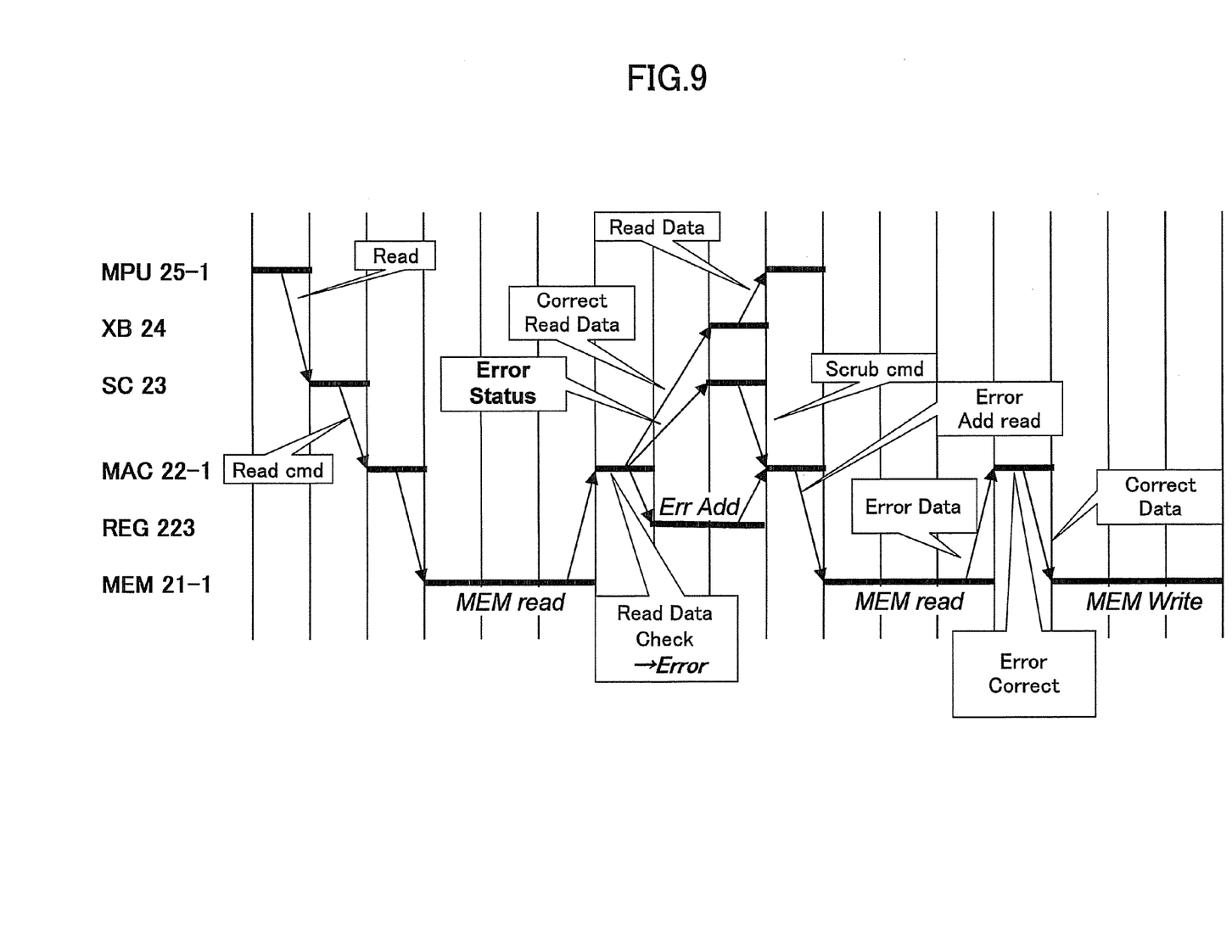
FIG. 9 is a time chart for explaining an error correction operation of the second embodiment.

In FIGS. 6 and 9 which will be described later, the same designations are used as in FIG. 3.

As shown in FIG. 5, each of the memory access controllers 102-1 through 102-n includes registers 321 through 326, an error detecting part (Checker) 327, a selector 328 and an error correcting part (Correct) 329, in addition to a controller (not shown). The system controller 103 includes selectors 331 and 332, and a register 33, in addition to a controller (not shown).

First, as shown in FIGS. 5 and 6, when a read command from the MPU 105-1 is input to the system controller 103 together with an address, the system controller 103 inputs the read command and the address to the memory access controller 102-1 via the selectors 331 and 332. The read command and the address are temporarily held in the registers 321 and 322 of the of the memory access controller 102-1, and input to the memory 101-1. The data read from the memory 101-1 and including an ECC are input to the memory access controller 102-1. If no error exists in the read data as a result of the error detection using the ECC in the error detecting part 327 of the memory access controller 102-1, the read data is held in the register 325 and input to the MPU 105-1 via the crossbar switch 104.

On the other hand, if an error exists in the read data as a result of the error detection using the ECC in the memory access controller 102-1, but the read data is correctable by the ECC, an error status (Error Status) is held in the register 324 and then notified to the system controller 103, and in addition, an address (Error Address) where the error was detected is held in the register 323 and then notified to the system controller 103 and held in the register 333 within the system controller 103. When the system controller 103 receives the error notification by the error status, the system controller 103 inputs to the selector 331 an error correction command (Scrub cmd) with respect to the address where the error was detected, without intervention by the MPU 105-1. Accordingly, the system controller 103 inputs the error correction command, together with the address where the error was detected and is held in the register 333, to the memory access controller 102-1 via the selectors 331 and 332, so that the data is read from the memory 101-1. Since the error of the read data is correctable by the ECC, the memory access controller 102-1 corrects the read data in the error correcting part 329 based on the error correction command, and rewrites the corrected data (corrected read data) to the address where the above described error was detected. More particularly, the memory access controller 102-1 inputs the read data to the error correcting part 329 via the selector 328, holds the read data that is corrected by the error correcting part 329 in the register 326 before inputting the corrected data to the memory 101-1, and rewrites the corrected data to the address where the error was detected. Hence, the correctable soft error within the memory 101-1 is corrected.

In the case of a normal data write, the write data from the MPU 105-1 is input to the selector 328 of the memory access controller 102-1 via the crossbar switch 104.

As described above, the memory system 130 is constructed so that all of the memory access controllers 102-1 through 102-n constantly and simultaneously carry out the memory accesses with respect to all of the memories 101-1 through 101-n at the same timing. For this reason, a soft error correction operation similar to the soft error correction operation with respect to the memory 101-1 via the memory access controller 102-1 is simultaneously carried out with respect to the memories 101-2 through 101-n via the other memory access controllers 102-2 through 102-n, regardless of whether or not the soft error exists in the memories 102-2 through 102-n.

But according to this embodiment, it is possible to make the structure of the system controller 103 relatively simple, reduce the load on the system controller 103, and enable application to the memory system 130 in which the system controller 103 and the crossbar switch 104 are separate.

Figure 7:
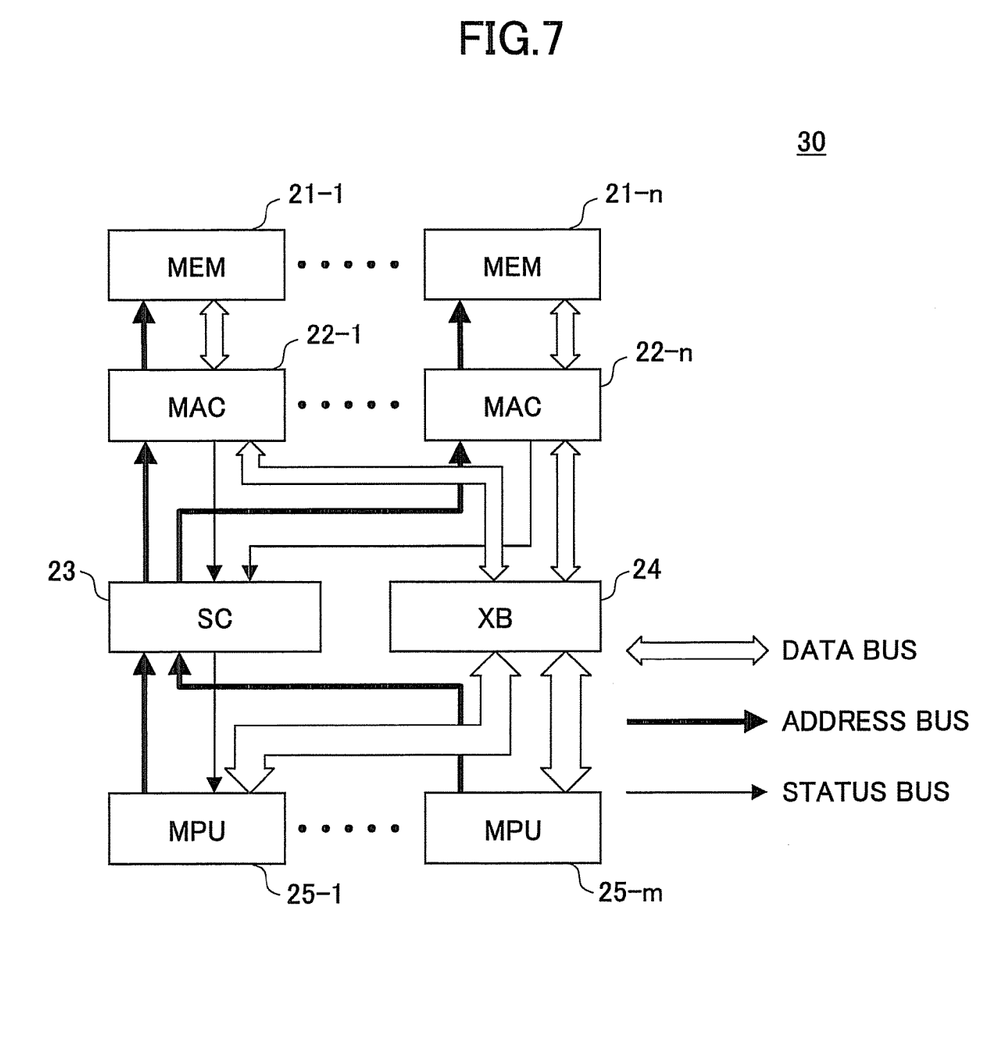
FIG. 7 is a system block diagram showing a second embodiment of the memory system according to the present invention.

FIG. 7 is a system block diagram showing a second embodiment of the memory system according to the present invention. This embodiment of the memory system employs a second embodiment of the soft error correction method according to the present invention. This embodiment differs from the first embodiment described above, in that the error address is held within the memory access controller and not within the system controller.

A memory system 30 shown in FIG. 7 has a structure for accessing byte-sliced data, that is, data that have been sliced in units of bytes. The memory system 30 includes a plurality of memories (MEMs) 21-1 through 21-n, a plurality of memory access controllers (MACs) 22-1 through 22-n, a system controller (SC) 23, a crossbar switch 24, and a plurality of MPUs 25-1 through 25-m. In FIG. 7, a data bus is indicated by a white arrow, an address bus is indicated by a bold solid line arrow, and a status bus is indicated by a solid line arrow.

A first embodiment of a memory control apparatus according to the present invention includes at least one memory access controller or, at least one memory access controller and a system controller or, at least one memory access controller, a system controller and a crossbar switch.

The memory access controllers 22-1 through 22-n are constructed to access the memories 21-1 through 21-n in units of bytes of the byte-sliced data, at synchronized access cycles. In other words, all of the memory access controllers 22-1 through 22-n constantly and simultaneously carry out the memory accesses with respect to all of the memories 21-1 through 21-n at the same timing, so that no synchronization error is generated in the accesses to the memories 21-1 through 21-n.

On the other hand, in the memories 21-1 through 21-n that are made up of memory devices such as DRAMs and SRAMs, a soft error is generated at a predetermined probability. Hence, in a case where reliability is required of the memory system 30, the data within the memories 21-1 through 21-n are corrected using a data protection mechanism such as the ECC.

For example, if a correctable soft error is generated in one memory 21-1 and the memory access controller 22-1 detects this soft error, the memory access controller 22-1 that detects the soft error cannot carry out the error correction operation by itself, because all of the memory access controllers 22-1 through 22-n operate in synchronism. In this embodiment, the error correction operation is carried out in response to a command from the system controller 23. For this reason, in a case where the correctable soft error is generated within the memory 21-1 and the system controller 23 carries out the error correction operation with respect to the soft error within the memory 21-1 via the memory access controller 22-1, the following series of operations are required.

Figure 8:
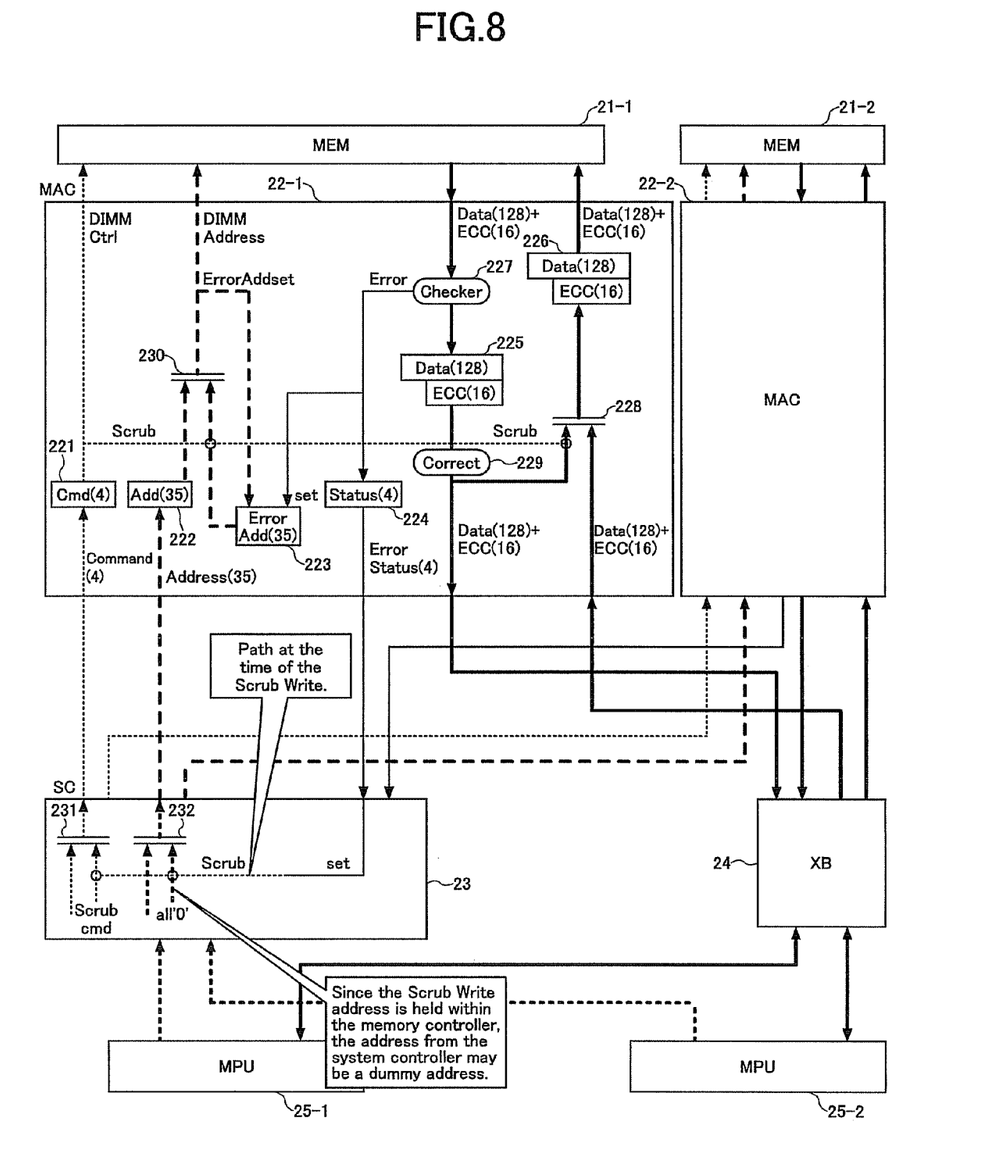
FIG. 8 is a system block diagram functionally showing an important part of the second embodiment of the memory system.

FIGS. 8 and 9 are diagrams for explaining the error correction operation in such a case. FIG. 8 is a system block diagram functionally showing an important part of the memory system 30, and FIG. 9 is a time chart for explaining the error correction operation of this second embodiment. In FIG. 8, a dotted line arrow indicates a command flow, a bold dotted line arrow indicates an address flow, a solid line arrow indicates a status flow, and a bold solid line arrow indicates a data flow. In addition, numerals in brackets in FIG. 8 indicate the number of bits.

As shown in FIG. 8, each of the memory access controllers 22-1 through 22-n includes registers 221 through 226, an error detecting part (Checker) 227, selectors 228 and 230, and an error correcting part (Correct) 229, in addition to a controller (not shown). The system controller 23 includes selectors 231 and 232, in addition to a controller (not shown).

First, as shown in FIGS. 8 and 9, when a read command from the MPU 25-1 is input to the system controller 23 together with an address, the system controller 23 inputs the read command and the address to the memory access controller 22-1 via the selectors 231 and 232. The read command and the address are temporarily held in the corresponding registers 221 and 222 of the of the memory access controller 22-1, and input to the memory 21-1 via the selector 230. The data read from the memory 21-1 and including an ECC are input to the memory access controller 22-1. If no error exists in the read data as a result of the error detection using the ECC in the error detecting part 227 of the memory access controller 22-1, the read data is held in the register 225 and input to the MPU 25-1 via the error correcting part 229 and the crossbar switch 24, without being corrected in the error correcting part 229.

On the other hand, if an error exists in the read data as a result of the error detection using the ECC in the memory access controller 22-1, but the read data is correctable by the ECC, an error status (Error) is held in the register 224 and then notified to the system controller 23, and in addition, an address (Error Address) where the error was detected is held in the register (REG) 223 within the memory access controller 22-1. The read data detected of the error that is correctable by the ECC in the error detecting part 227 is held in the register 225 and then corrected in the error correcting part 229, and the corrected data (corrected read data) is input to the MPU 25-1 via the crossbar switch 24.

When the system controller 23 receives the error notification by the error status, the system controller 23 generates an error correction command (Scrub cmd) with respect to the address where the error was detected, and a preset dummy read address that is made up of all "0"s, for example, and inputs the error correction command and the preset dummy read address to the memory access controller 22-1 via the selectors 231 and 232, without intervention by the MPU 25-1. Accordingly, the memory access controller 22-1 having the register 223 that stores the address where the error was detected, reads the data from the memory 21-1, by inputting to the memory 21-1 the address that is held in the register 223 via the selector 230 and the error correction command that is temporarily held in the register 221. Since the error in the read data is correctable by the ECC, the memory access controller 22-1 corrects the read data in the error correcting part 229 based on the error correction command, and then rewrites the corrected data to the address where the error was detected. More particularly, the memory access controller 22-1 holds the read data that is corrected by the error correcting part 229 in the register 226 via the selector 228, before inputting the corrected data to the memory 21-1, so as to rewrite the corrected data to the address where the error was detected. Hence, the correctable soft error within the memory 21-1 is corrected.

On the other hand, the memory access controllers 22-2 through 22-n having the register 223 that does not store the address where the error was detected, input to the corresponding memories 21-2 through 21-n the dummy read address via the selector 230 and the error correction command that is temporarily held in the register 221. Hence, with respect to the memories 21-2 through 21-n, the data that is read from the dummy read address is written back as it is via the error detecting part 227, the register 225, the error correcting part 229, the selector 228 and the register 226. The memory system 30 is constructed so that all of the memory access controllers 22-1 through 22-n constantly and simultaneously carry out the memory accesses with respect to all of the memories 21-1 through 21-n at the same timing. For this reason, a soft error correction operation similar to the soft error correction operation with respect to the memory 21-1 via the memory access controller 22-1 is also simultaneously carried out with respect to the memories 21-2 through 21-n via the other memory access controllers 22-2 through 22-n, regardless of whether or not the soft error exists in the memories 22-2 through 22-n, with respect to the dummy read address of the memories 21-2 through 21-n.

Of course, the system controller may control the memory access controllers 22-2 through 22-n that do not hold the error address, in response to the error notification by the error status, so as to read the data from a preset address of the corresponding memories 21-2 through 21-n, and thereafter perform a timing adjustment by waiting for a time it would take to carry out the write back, without actually carrying out the write back.

In the case of a normal data write, the write data from the MPU 25-1 is input to the selector 228 of the memory access controller 22-1 via the crossbar switch 24.

According to this embodiment, it is possible to make the structure of the system controller 23 relatively simple, reduce the load on the system controller 23, and enable application to the memory system 30 in which the system controller 103 and the crossbar switch 24 are separate.

Furthermore, according to the present invention, it is unnecessary to realize by software, from the MPU 25-1, the reading from the address where the error was detected and the rewriting to the same address, when correcting the soft error. Instead, the soft error is corrected by the memory access controller 22-1 that holds the address where the error was detected, in response to a trigger from the system controller 23. Consequently, in a case where a correctable soft error that does not interfere with the execution of the software is generated, it is possible to correct the soft error as described above, without having to temporarily interrupt the execution of the software. In other words, it is possible to correct the soft error without software intervention, and it is also possible to prevent a synchronization error from being generated among the memory access controllers. Therefore, it is possible to correct the soft error within the memory without increasing the overhead of the software and without deteriorating the throughput of the memory.

Figure 10:
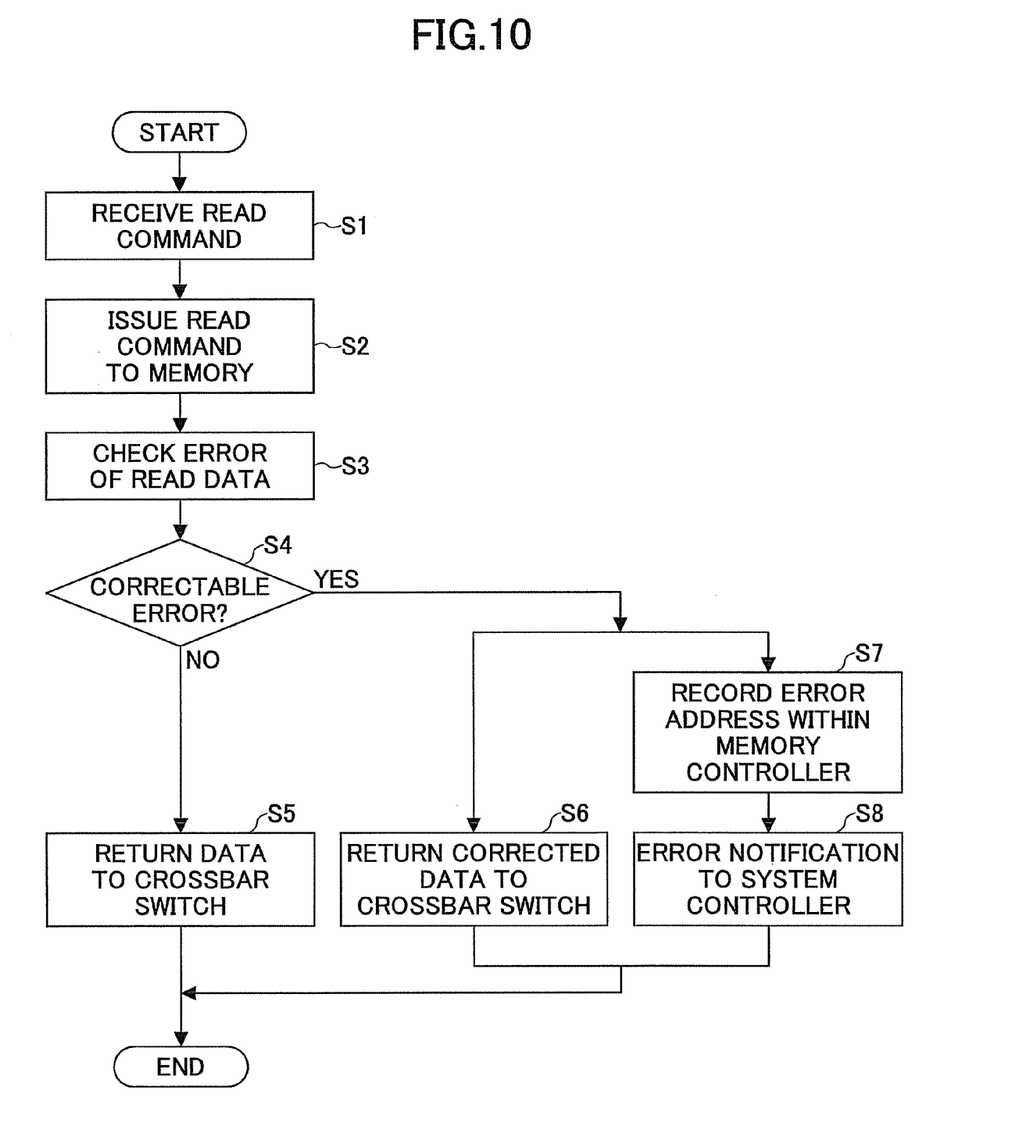
FIG. 10 is a flow chart for explaining a read operation of a memory access controller of the second embodiment.

FIG. 10 is a flow chart for explaining a read operation of the memory access controller 22-1 of the second embodiment. In FIG. 10, a step S1 receives the read command from the MPU 25-1 via the system controller 23. A step S2 issues the read command with respect to the memory 21-1. A step S3 receives the read data from the memory 21-1, and detects (or checks) the error in the read data by the error detecting part 227. A step S4 decides whether or not the correctable error is detected within the read data. If the decision result in the step S4 is NO, a step S5 returns the read data to the MPU 25-1 via the crossbar switch 24, and the process ends.

On the other hand, if the decision result in the step S4 is YES, steps S6, S7 and S8 are carried out in parallel. The step S6 returns the read data that has been corrected of the error by the error correcting part 229 to the MPU 25-1 via the crossbar switch 24. The step S7 holds (or records) the address (error address) where the error was detected, in the register 223 within the memory access controller 22-1, and the step S8 notifies the generation of the error to the system controller 23 by the error status (error notification). At this point in time, the data in the memory 21-1 at the address where the error was generated is not yet corrected or rewritten. The process ends after the steps S6 and the steps S7 and S8.

In the case of the first embodiment described above, the error address is held (or recorded) in the register 333 within the system controller 103 and not in the register 223 within the memory access controller when carrying out the step S7, but otherwise, the read operation of the first embodiment is basically the same as that of the second embodiment.

Figure 11:
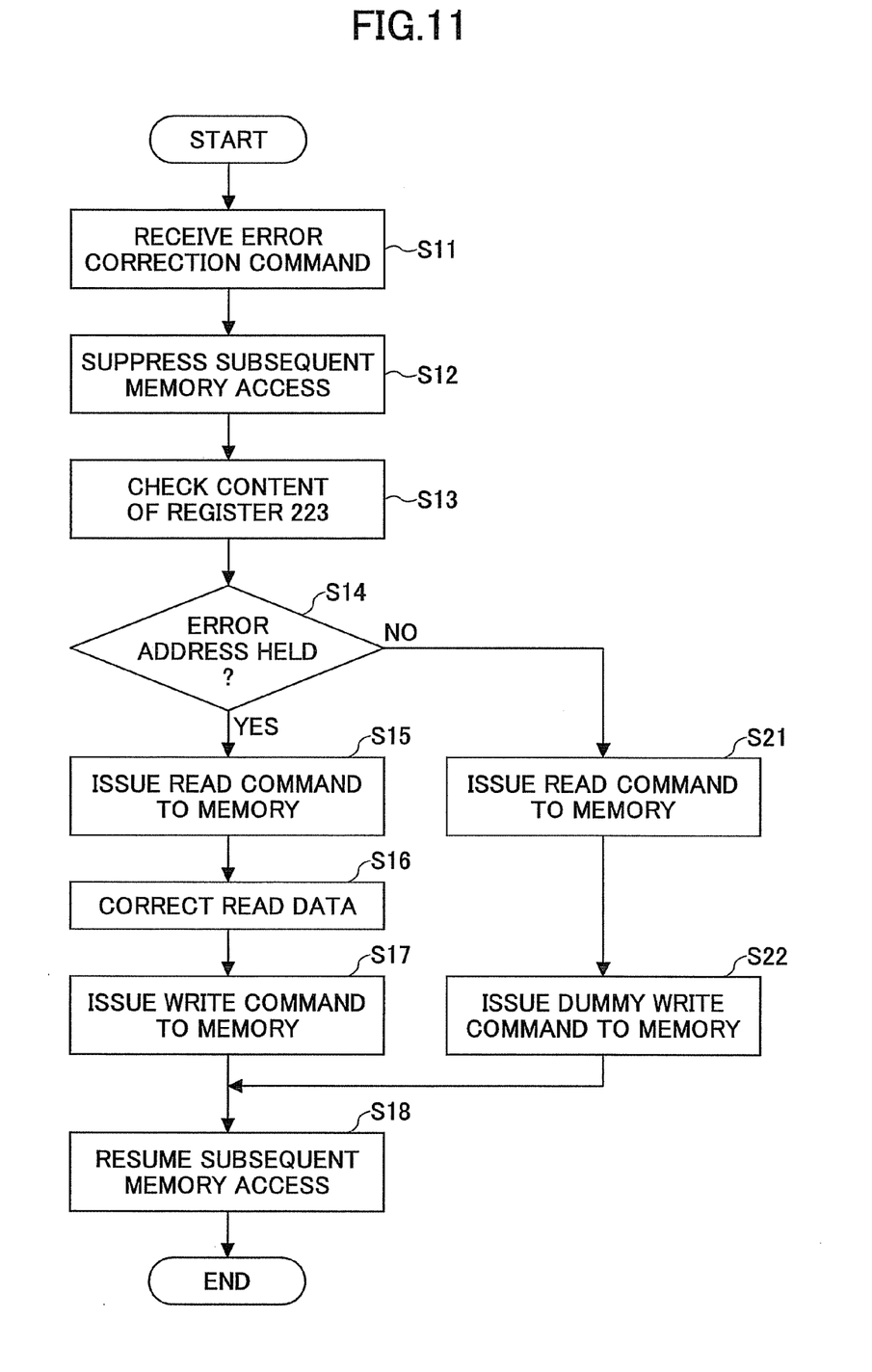
FIG. 11 is a flow chart for explaining an error correction operation of the memory access controller of the second embodiment.

FIG. 11 is a flow chart for explaining an error correction operation of the memory access controllers 22-1 through 22-n of the second embodiment. In FIG. 11, a step S11 receives the error correction command from the system controller 23. As described above, the system controller 23 generates the error correction command together with the dummy read address, in response to the error notification by the error status from the memory access controller 21-1. A step S12 suppresses the subsequent memory accesses. As a result, while the error correction operation is being carried out, the memory access from the MPU 25-1 or the like is suppressed.

A step S13 checks the content of the register 223, and a step S14 decides whether or not the error address is held within each of the memory access controllers 22-1 through 22-n. If the error address is held within the memory access controller, as in the case of the memory access controller 22-1, the decision result in the step S15 becomes YES, and the process advances to a step S15. The step S15 reads the data from the error address by issuing the read command with respect to the corresponding memory 21-1. A step S16 corrects the read data that is read from the error address, in the error correcting part 229. In addition, a step S17 issues the write command to the corresponding memory 21-1 and rewrites the corrected read data to the error address. A step S18 cancels the suppression of the subsequent memory accesses, so that the subsequent memory accesses may be resumed, and the process ends.

On the other hand, if the error address is not held within the memory access controller, as in the case of the memory access controllers 22-2 through 22-n, the decision result in the step S14 becomes NO, and the process advances to a step S21. The step S21 issues the read command to the corresponding memories 21-2 through 21-n, and reads the data from the dummy read address. A step S22 issues the write command to the corresponding memories 21-2 through 21-n and writes back the read data as it is to the dummy read address, and the step S18 cancels the suppression of the subsequent memory accesses, so that the subsequent memory accesses may be resumed, and the process ends. Accordingly, it is possible to correct the soft error within the memories 21-1 through 21-n without generating a synchronization error among the memory access controllers 22-1 through 22-n.

The status bus from the memory access controller 22-1 to the system controller 23 may be used for a notification other than the error notification described above. When using the status bus for a status notification from the memory access controller 21-1 to the system controller 23, a priority with which the error notification is issued from the memory access controller 22-1 may be set lower than that for the status notification, so that no synchronization error will be generated even when sharing the status bus.

Next, a description will be given of a first modification of the present invention. In the second embodiment described above, the error correction operation of the memory controller 22-1 is started in response to the trigger from the system controller 23 that receives the error notification from the memory access controller 22-1. But in this first modification, the error correction operation is carried out periodically.

In this first modification, a counter means such as a clock or timer is provided within each of the memory access controllers 22-1 through 22-n so that the n counter means operate in synchronism with each other, and the error correction operation is started at a preset timing based on the time or timing information managed by the counter means. In this case, even if a soft error within the memory 21-1 is detected by the memory access controller 22-1, for example, no error notification is made to the system controller 23, and the error address is held within the memory access controller 22-1 until the start time of the error correction operation. The error correction operation is carried out when the start time comes. As a result, it becomes unnecessary to provide a circuit for carrying out the error correction process within the system controller 23, and it is possible to further simplify the structure of the memory system 30.

Next, a description will be given of a second modification of the present invention. In the first embodiment described above, the error correction operation of the memory access controller 22-1 is started in response to the trigger from the system controller 23 that receives the error notification from the memory access controller 22-1. But in this second modification, the error correction operation is carried out when an idle state of the memory access controller 22-1 continues for a predetermined time.

In this second modification, a circuit for judging or detecting a busy state is provided in each of the memory access controllers 22-1 through 22-n, and the error correction process is started when the idle state continues for the predetermined time. As a result, it becomes unnecessary to provide a circuit for carrying out the error correction process within the system controller 23, and it is possible to further simplify the structure of the memory system 30.

Therefore, the present invention suited for application to memory systems having a structure that requires the soft error within the memories to be corrected without generating the synchronization error among the memory access controllers.

This application claims the benefit of a Japanese Patent Application No. 2005-078010 filed Mar. 17, 2005, in the Japanese Patent Office, the disclosure of which is hereby incorporated by reference.

Further, the present invention is not limited to these embodiments, but various variations and modifications may be made without departing from the scope of the present invention.

What is claimed is:

1. A memory control apparatus for a memory system having a plurality of memories configured to store byte-sliced data, a plurality of memory access controllers provided in correspondence with the plurality of memories and respectively configured to make an access in cycle synchronism with respect to a corresponding one of the plurality of memories, and a system controller configured to issue a read request with respect to the plurality of memory access controllers, comprising:
- a first circuit configured to hold an error address where a correctable error is detected when the correctable error is detected in data read from one of the plurality of memories;
- a second circuit configured to make an error notification with respect to the system controller;
- a third circuit configured to receive an error correction request and a dummy read address from the system controller; and
- a fourth circuit configured to read the data from the error address and perform a soft error correction when the first circuit holds error address and the error correction request is received by the third circuit, and to read the data from the dummy read address received by the third circuit and write back the read data when the first circuit does not hold the error address.

2. The memory control apparatus as claimed in claim 1, wherein the second circuit makes the error notification via a bus that sends a status from the system controller to the one of the plurality of memory access controllers.

3. A memory system comprising:
- a plurality of memories configured to store byte-sliced data;
- a plurality of memory access controllers, provided in correspondence with the plurality of memories, and respectively configured to make an access in cycle synchronism with respect to a corresponding one of the plurality of memories; and
- a system controller configured to issue a read request with respect to each of the plurality of memory access controller, based on a memory access request,
wherein each of the plurality of memory access controllers includes
- a first circuit configured to hold an error address where a correctable error is detected when the correctable error is detected in data read from one of the plurality of memories,
- a second circuit configured to make an error notification with respect to the system controller,
- a third circuit configured to receive an error correction request and a dummy read address from the system controller, and
- a fourth circuit configured to read the data from the error address and perform a soft error correction when the first circuit holds error address and the error correction request is received by the third circuit, and to read the data from the dummy read address received by the third circuit and write back the read data when the first circuit does not hold the error address, and
wherein the system controller includes
- a fifth circuit configured to send the error correction request and the dummy read address to each of the plurality of memory access controllers when the error notification is received from one of the plurality of memory access controllers.

4. The memory system as claimed in claim 3, wherein the second circuit makes the error notification via a bus that sends a status from the system controller to the one of the plurality of memory access controllers.

5. A soft error correction method for a memory system having a plurality of memory access controllers that are respectively configured to access one of a plurality of memories that store byte-sliced data in cycle synchronism with each other, and a system controller configured to receive a memory access from one of a plurality of MPUs and to issue a read request with respect to each of the plurality of memory access controllers, comprising:
- when one of the plurality of memory access controllers detects a correctable error in data read from one of the plurality of memories, holding an error address where the error is detected and sending an error notification from said one of the plurality of memory access controllers to the system controller;
- responsive to the error notification from said one of the plurality of memory access controllers, sending an error correction request and a dummy read address from the system controller to each of the plurality of memory access controllers;
- when said one of the plurality of memory access controllers receives the error correction request, reading the data from the error address and performing a soft error correction by said one of the plurality of memory access controllers; and
- reading the data from the dummy read address and writing back the read data by each of the plurality of memory access controllers not holding the error address.

6. The soft error correction method as claimed in claim 5, wherein the second circuit makes the error notification via a bus that sends a status from the system controller to the one of the memory access controllers.

* * * * *